(12) United States Patent
Ho

(10) Patent No.: US 6,925,298 B2
(45) Date of Patent: Aug. 2, 2005

(54) INITIALIZATION FOR HYPER FRAME NUMBER OF SIGNALING RADIO BEARERS

(75) Inventor: Jimmy Chi-Fong Ho, Hsin-Chu Hsien (TW)

(73) Assignee: ASUSTek Computer Inc., Taipei (TW)

( * ) Notice: Subject to any disclaimer, the term of this patent is extended or adjusted under 35 U.S.C. 154(b) by 332 days.

(21) Appl. No.: 10/064,865

(22) Filed: Aug. 26, 2002

(65) Prior Publication Data

US 2004/0038668 A1 Feb. 26, 2004

(51) Int. Cl.[7] .............................................. H04M 1/66
(52) U.S. Cl. ................... 455/411; 455/410; 455/412.1; 380/247
(58) Field of Search ................................. 455/410, 411, 455/414.1, 418; 380/249, 270, 271, 272, 255, 273

(56) References Cited

U.S. PATENT DOCUMENTS

| 5,457,737 A | * | 10/1995 | Wen ........................... 455/410 |
| 2002/0044552 A1 | * | 4/2002 | Vialen et al. ............... 370/389 |
| 2002/0197979 A1 | * | 12/2002 | Vanderveen ................. 455/410 |
| 2003/0036377 A1 | * | 2/2003 | Kuo et al. ................... 455/411 |

* cited by examiner

Primary Examiner—William Trost
Assistant Examiner—Wesley Kim
(74) Attorney, Agent, or Firm—Winston Hsu

(57) ABSTRACT

A wireless communication system comprises an integrity key, a mobile unit comprising a first integrity count value, and a UTRAN comprising a second integrity count value. The UTRAN is coupled to the mobile unit for transmitting a control command to the mobile unit. The control command is used for starting an integrity protection process for a radio bearer, with the integrity protection process using the integrity key and the first and second integrity count values for verifying a transmission integrity between the mobile unit and the UTRAN. The mobile unit sends a START value for the radio bearer to the UTRAN. The UTRAN sends the control command to the mobile unit to activate integrity protection along the radio bearer, and sets the x most significant bits of the second integrity count value of the UTRAN equal to the START value last received from the mobile unit for the radio bearer. In response to receiving the control command, the mobile unit sets the x most significant bits of the first integrity count value of the mobile unit equal to the START value last transmitted to the UTRAN.

5 Claims, 5 Drawing Sheets

INITIALIZATION FOR HYPER FRAME NUMBER OF SIGNALING RADIO BEARERS

BACKGROUND OF INVENTION

1. Field of the Invention

The present invention relates to hyper frame numbers of a signaling radio bearer, and more particularly, to a method for initializing the hyper frame numbers of signaling radio bearer.

2. Description of the Prior Art

Please refer to FIG. 1. FIG. 1 is a block diagram of a wireless communications network 10, as defined by the 3$^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference. The wireless communications network 10 comprises a plurality of radio network subsystems (RNSs) 20 in communications with a core network (CN) 30. The plurality of RNSs 20 is termed a Universal Mobile Telecommunications System (UMTS) Terrestrial Radio Access Network, or UTRAN for short. Each RNS 20 comprises one radio network controller (RNC) 22 that is in communications with a plurality of Node Bs 24. Each Node B 24 is a transceiver, which is adapted to send and receive wireless signals. In particular, the wireless communications network 10 assigns a mobile unit 40 (generally termed a "UE" for User Equipment) to a particular RNS 20, which is then termed the serving RNS (SRNS) 20s of the UE 40. Data destined for the UE 40 is sent by the CN 30 (or UTRAN 20) to the SRNS 20s. It is convenient to think of this data as being sent in the form of one or more packets that have a specific data structure, and which travel along one of a plurality of radio bearers (RBs) 28, 48. An RB 28 established on the SRNS 20s will have a corresponding RB 48 established on the UE 40. The RBs are numbered consecutively, from RB0 to RBn. Typically, RB0 to RB4 are dedicated signaling RBs (SRBs), which are used for passing protocol signals between the UTRAN 20 and the UE 40. RBs 28, 48 greater than four (i.e., RB5, RB6, etc.) are typically used to carry user data, but may also be SRBs. Each RB 28, 48 is associated with one domain within the CN 30. Currently, two domains exists a packet switched (PS) domain 30p, and a circuit switched (CS) domain 30c. The RNC 29 utilizes a Node B 24, which is assigned to the UE 40 by way of a Cell Update procedure, to transmit data to, and receive data from, the UE 40. The Cell Update procedure is initiated by the UE 40 to change a cell as defined by a Node B 24, and even to change a URA. Selection of a new cell region will depend, for example, upon the location of the UE 40 within the domain of the SRNS 20s. The UE 40 broadcasts data to the wireless communications network 10, which is then picked up by the SRNS 20s and forwarded to the CN 30. Occasionally, the UE 40 may move close to the domain of another RNS 20, which is termed a drift RNS (DRNS) 20d. A Node B 24 of the DRNS 20d may pick up the signal transmitted by the UE 40. The RNC 29 of the DRNS 20d forwards the received signal to the SRNS 20s. The SRNS 20s uses this forwarded signal from the DRNS 20d, plus the corresponding signals from its own Node Bs 24 to generate a combined signal that is then decoded and finally processed into packet data. The SRNS 20s then forwards the received data to the CN 30. Consequently, all communications between the UE 40 and the CN 30 must pass through the SRNS 20s.

Please refer to FIG. 2 in conjunction with FIG. 1. FIG. 2 is a simple block diagram of the UMTS radio interface protocol architecture. Communications between the UE 40 and the UTRAN 20u is effected through a multi-layered communications protocol that includes a layer 1, a layer 2 and a layer 3, which together provide transport for a signaling plane (C-plane) 92 and a user plane (U-plane) 94. Layer 1 is the physical layer 60, and in the UTRAN 20u is responsible for combining signals received from the DRNS 20d and SRNS 20s. Layer 2 includes a packet data convergence protocol (PDCP) layer 70, a Radio Link Control (RLC) layer 72, and a Medium Access Control (MAC) layer 74. Layer 3 includes a Radio Resource Control (RRC) layer 80. The U-plane 94 handles user data transport between the UE 40 and the UTRAN 20u, whereas the C-plane 92 handles transport for signaling data between the UE 40 and the UTRAN 20u. The RRC 80 sets up and configures all radio bearers between the UTRAN 20u and the UE 40. The PDCP layer 22 provides header compression for Service Data Units (SDUs) received from the U-plane 94. The RLC layer 72 provides segmentation of PDCP 70 SDUs and RRC 80 SDUs into RLC protocol data units (PDUs), and under acknowledged mode (AM) transfers, can provide upper layers (such as the PDCP layer 70 or the RRC layer 80) with a confirmation that RLC PDUs have been successfully transmitted and received between the UTRAN 20u and the UE 40. The MAC layer 74 provides scheduling and multiplexing of RLC PDUs onto the transport channel, interfacing with the physical layer 60.

A number of configuration procedures are available to the RRC layer 80 to setup and configure RBs 28, 48. These configuration procedures requires the UTRAN 20u to send a specific message to the UE 40 along an RB 28, 48, and the UE 40 to respond in turn with a corresponding message. Generally speaking, the messages are transmitted via signaling radio bearers (SRB) such as RB0 to RB4 48 shown in FIG. 1. Other radio bearers are used for transmitting user data. The messages include Radio Bearer Setup, Radio Bearer Reconfiguration, Radio Bearer Release, etc. For each of these messages, the UE 40 has a corresponding "Complete" or "Failure" response message indicating success or failure of the procedure on the UE 40, and which may provide the UTRAN 20u any necessary information for the UTRAN 20u to complete the procedure. In addition, the configuration messages and the response messages may carry optional information elements (IEs), which are fields of data that hold auxiliary information.

Please refer to FIG. 1 and FIG. 3. FIG. 3 is a simplified block diagram of the UTRAN 20u and UE 40 shown in FIG. 1. The wireless communications system includes a UE 40 in wireless communications with a UTRAN 20u. The UE 40 communicates with the UTRAN 20u over a plurality of radio bearers 48. The UTRAN 20u thus has corresponding radio bearers 28, one for each of the radio bearers 48. Each radio bearer 48 has a receiving buffer 50r for holding protocol data units (PDUs) 52r received from the corresponding radio bearer 28 of the UTRAN 20u. Each radio bearer 48 also has a transmitting buffer 50t for holding PDUs 52t that are awaiting transmission to the corresponding radio bearer 28 of the UTRAN 20u. A PDU 52t is transmitted by the UE 40 along a radio bearer 48 and received by the UTRAN 20u to generate a corresponding PDU 62r in the receiving buffer 60r of the corresponding radio bearer 28. Similarly, a PDU 62t is transmitted by the UTRAN 20u along a radio bearer 28 and received by the UE 40 to generate a corresponding PDU 52r in the receiving buffer 50r of the corresponding radio bearer 48.

In general, every PDU 52r, 52t, 62r and 62t will have a sequence number 53r, 53t, 63r, 63t. The sequence number 53r, 53t, 63r, 63t is an m-bit number that is incremented for each PDU 52r, 52t, 62r, 62t. The magnitude of the sequence number 53r, 53t, 63r, 63t indicates the sequential ordering of the PDU 52r, 52t, 62r, 62t in its buffer 50r, 50t, 60r, 60t. For example, a received PDU 52r with a sequence number 53r of 108 is sequentially before a received PDU 52r with a sequence number 53r of 109, and sequentially after a PDU 52r with a sequence number 53r of 107. For example, the UTRAN 20u can scan the sequence numbers 63r embedded within the received PDUs 62r to determine the sequential ordering of the PDUs 62r, and to determine if any PDUs 62r are missing. The UTRAN 20u can then send a message to the UE 40 that indicates which PDUs 62r were received by using the sequence numbers 63r of each received PDU 62r, or may request that a PDU 52t be re-transmitted by specifying the sequence number 53t of the PDU 52t to be re-transmitted. This is particularly true of AM connections. Ideally, the sequence numbers 52t maintained by the UE 40 for the PDUs 52t are identical to the corresponding sequence numbers 63r for the PDUs 62r that are maintained by the UTRAN 20u.

Hyper-frame numbers (HFNs) are also maintained by the UE 40 and the UTRAN 20u. Hyper-frame numbers may be thought of as high-order (i.e., most significant bits, MSBs) of the sequence numbers 53t, 63t, and which are never physically transmitted with the PDUs 52t, 62t. Exceptions to this rule occur in rare cases of special signaling PDUs 52t, 62t that are used for synchronization. Each radio bearer 48 of the UE 40 has a receiving hyper-frame number (HFN$_R$) 54r and a transmitting hyper-frame number (HFN$_T$) 54t. Similarly, the corresponding radio bearer 28 on the UTRAN 20u has a HFN$_R$ 64r and a HFN$_T$ 64t. When the UE 40 detects rollover of the sequence numbers 53r of PDUs 52r in the receiving buffer 50r, the UE 40 increments the HFN$_R$ 13r. On rollover of sequence numbers 53t of transmitted PDUs 52t, the UE 40 increments the HFN$_T$ 54t. A similar process occurs on the UTRAN 20u for the HFN$_R$ 64r and HFN$_T$ 64t.

Each of the UE 40 and the UTRAN 20u has a security engine 55, 65 respectively. The security engine has two objectives. One primary function of the security engines 55, 65 is to verify the integrity of data contained within the PDUs 50r, 60r. This is used to prevent improper devices from masquerading as either the UE 40 or the UTRAN 20u. By verifying data integrity, the UE 40 can be certain that a PDU 52r was, in fact, transmitted by the UTRAN 20u, and vice versa. This integrity protection is performed by the RRC 80, and is used only for SRBs 28, 48. For transmitting a PDU 52t, the security engine 55 uses, amongst other inputs, an n-bit integrity count 56c and an integrity key 57k to perform the integrity protection. The operation of the integrity protection is similar to encoding/decoding functions upon the PDU 53t according to the integrity count 56c, 66c and the integrity key 57k, 67k. To properly verify the integrity of the corresponding PDU 63r, the security engine 65 must use an identical integrity count 66c and integrity key 67k. In addition, the UE 40 further has a non-volatile memory 58 such as a SIM card that is used for storing a START list 59. The second function of the security engines 55, 65 is to obfuscation (i.e., ciphering, or encryption) of data held within a PDU 52t, 62t so that the corresponding PDU 62r, 62r presents a meaningless collection of random numbers to an eavesdropper. Each of the security engines 55, and 65 further comprises a security key (not shown) and a security count (not shown) for performing the security operation. The ciphering/deciphering process is typically performed by the RLC layer 72. When the UE 40 is prepared to power off, for each domain 30p, 30c, the UE 40 will use the highest value among all integrity counts 56c and the security counts related to that domain 30p, 30c to obtain the START list 59, and stores the start list 59 in the nonvolatile memory 58.

The integrity count 56c for a PDU 52t is generated by using the sequence number 53t of the PDU 52t as the least significant bits of the integrity count 56c, and the HFN$_T$ 54t associated with the sequence number 53t as the most significant bits of the integrity count 56c. Similarly, the security count 56c for a PDU 52r is generated from the sequence number 53r of the PDU 52r and the HFN$_R$ 54r of the PDU 52r. An identical process occurs on the UTRAN 20u, in which the integrity count 66c is generated by using the sequence number 63r or 63t, and the appropriate HFN$_R$ 64r or HFN$_T$ 64t. The integrity count 56c, 66c has a fixed bit size, say 32 bits for example. The START list 59 is used for generating the initial values for the HFN$_T$ 54t, 64t and the HFN$_R$ 54r, 64r that are related to the integrity counts 56c, 66c. The START list 59 holds the x most significant bits (MSB$_x$) of a hyper-frame number from a previous session along a radio bearer 48, as discussed earlier, for each domain 30c, 30p. Ideally, x should be at least as large as the bit size of the smallest-sized hyperframe number (i.e., x should be at least 20 bits in size). Then, for each domain 30p, 30c the corresponding hyper-frame number from the previous session along the radio bearer 48 is increased by one to generate the START list 59 stored in the nonvolatile memory 58 before the UE 40 is powered off. When the UE 40 is powered up later, the START list 59 is transmitted to the UTRAN 20u to provide a corresponding START list 70. In this manner, the START list 59 is used for initializing the hyper-frame numbers of the UE 40 and UTRAN 20u. That is, the MSB$_x$ of the HFN$_T$ 54t, 64t and the HFN$_R$ 54r, 64r within a domain 30p, 30c are set to the START value 59 for that domain 30p, 30c within the START list 59, 70, and the remaining low order bits are set to zero.

Please refer to FIG. 4, which is a timing diagram of operations related to the prior art integrity protection. Suppose the UE 40 is originally powered off, and the START list 59 has stored a value of 80 for the PS domain 30p (START$_1$). In FIG. 4, the horizontal axis represents time. When the UE 40 is powered on at T, the UE 40 will first transmit the START list 59 to the UTRAN 20u. The UTRAN 20u has the "START list" 70 for keeping START list 59 transmitted from the UE 40. As with the UE 40, there is a START value within the START list 70 for each domain 30p, 30c. It is noted that the "START list" 70 related to the UE 40 will hold the start value of 80 for the PS domain 30p. Only the HFN$_T$ 54t and HFN$_R$ 64r are shown for simplicity in the following example. It is obvious that after the UE 40 is powered on, there is no signaling radio bearer or radio bearer existed between the UTRAN 20u and the UE 40 initially. When the UTRAN 20u commands the UE 40 to start integrity protection by sending a "SECURITY MODE COMMAND" message at T+dt, the HFNs 64r, 64t for the signaling radio bearer 28 will be initialized by the corresponding start value recorded in the "START list" 70 according to the prior art. The HFN$_R$ 64r, therefore, becomes 80. On the other hand, the HFN$_T$ 54t should be initialized according to a calculated start value. According to the prior art, the calculated start value is generated by considering all HFNs 54r, 54t of existing radio bearers and signaling radio bearers within the domain 30p, selecting the largest such HFN and adding one to the value. Please note that only the radio bearers and signaling radio bearers that have been ciphered or integrity protected shall be taken into consideration for above-mentioned START value calculation. As mentioned above, when the UE 40 is powered on at T, there is no signaling radio bearer or radio bearer existed between the UTRAN 20u and the UE 40 initially. Therefore, there is no security count related to ciphering or integrity count 56c, 66c related to integrity protection. Generally speaking, the integrity protection normally is started before the ciphering operation. When the UTRAN 20u sends a first "SECURITY MODE COMMAND" message to start the integrity protection prior to the ciphering operation, there is no applicable security count or integrity count used for calculating the START value that are used for initializing HFNs 54t, 54r, 64t, 64r. In other words, the calculated START value becomes a random number, and the $HFN_R$ 54r and the $HFN_T$ 54t will be initialized by the unexpected START value such as a random value 85. It is noteworthy that data integrity checking on the UE 40 uses an n-bit integrity count that must be synchronized with a corresponding integrity count on the UTRAN 20u. It is obvious that the integrity count 56c is not synchronized with the integrity count 66c owing to different HFN values. Therefore, the PDU 52 transmitted from the UE 40 to the UTRAN 20u will fail the integrity check and they will be discarded. Eventually, the communication connection 28, 48 established between the UE 40 and the UTRAN 20u will be released.

Suppose the ciphering operation has been started for the UE 40 and the UTRAN 20u.

SUMMARY OF INVENTION

It is therefore a primary objective of the present invention to provide a method for initializing HFNs of signaling radio bearers.

Briefly summarized, the claimed invention provides a method for setting an initial integrity count value for a signaling radio bearer in a wireless communication system. The wireless communication system comprises an integrity key, a mobile unit comprising a first integrity count value, and a universal terrestrial radio access network (UTRAN) comprising a second integrity count value. The UTRAN is coupled to the mobile unit for transmitting a control command to the mobile-unit. The control command is used for starting an integrity protection process for the signaling radio bearer wherein the integrity protection process use the integrity key and the first and second integrity count values for verifying a transmission integrity between the mobile unit and the UTRAN. The mobile unit sends a START value to the UTRAN. The UTRAN sends the control command to the mobile unit to activate integrity protection along the signaling radio bearer, and sets the x most significant bits of the second integrity count value of the UTRAN equal to the START value last received from the mobile unit. In response to receiving the control command, the mobile unit sets the x most significant bits of the first integrity count value of the mobile unit equal to the START value last transmitted to the UTRAN.

It is an advantage of the present invention that the initial value assigned to the integrity count of the signaling radio bearer for the UE is assured to be the same as the initial value for the integrity count that is assigned to the corresponding signaling radio bearer for the UTRAN. The integrity process along the signaling radio bearer is thus capable of performing correctly.

These and other objectives of the present invention will no doubt become obvious to those of ordinary skill in the art after reading the following detailed description of the preferred embodiment which is illustrated in the various figures and drawings.

DETAILED DESCRIPTION

Figure 1:
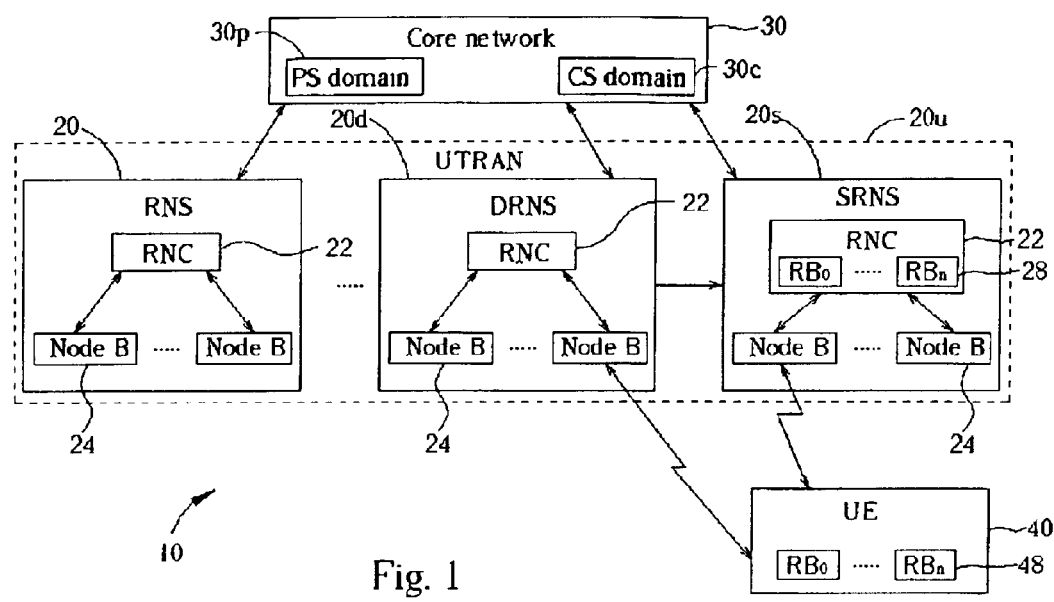
FIG. 1 is a block diagram of a wireless communications network.
Figure 2:
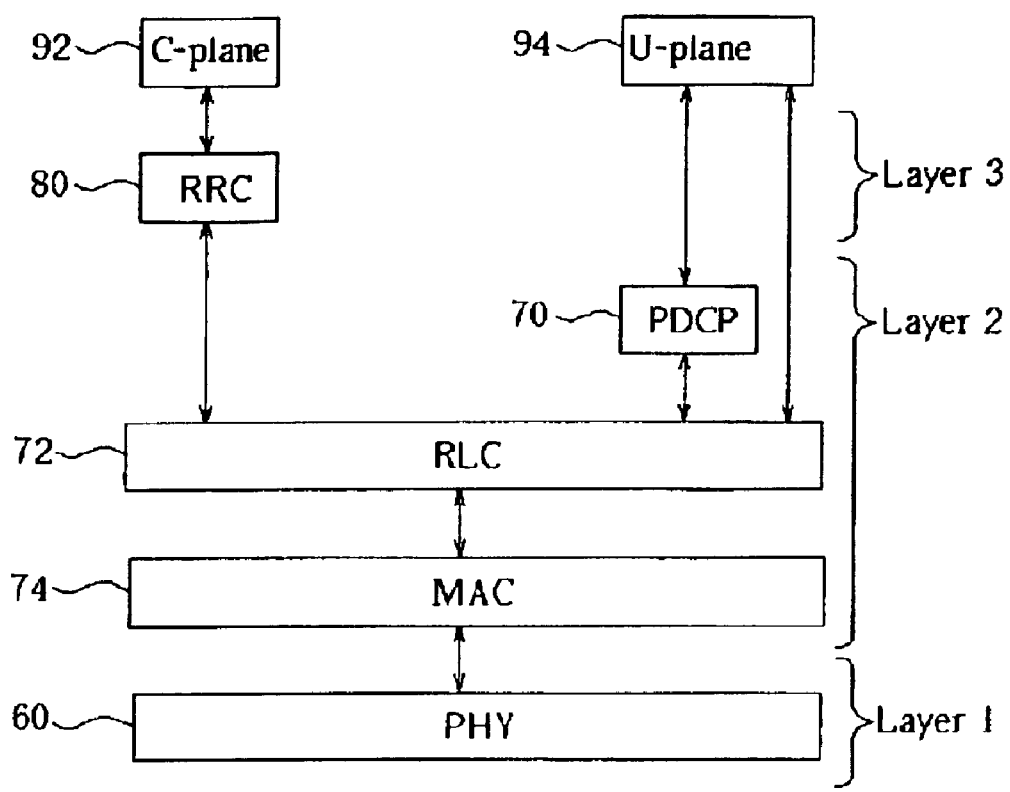
FIG. 2 is a simple block diagram of the UMTS radio interface protocol architecture.
Figure 3:
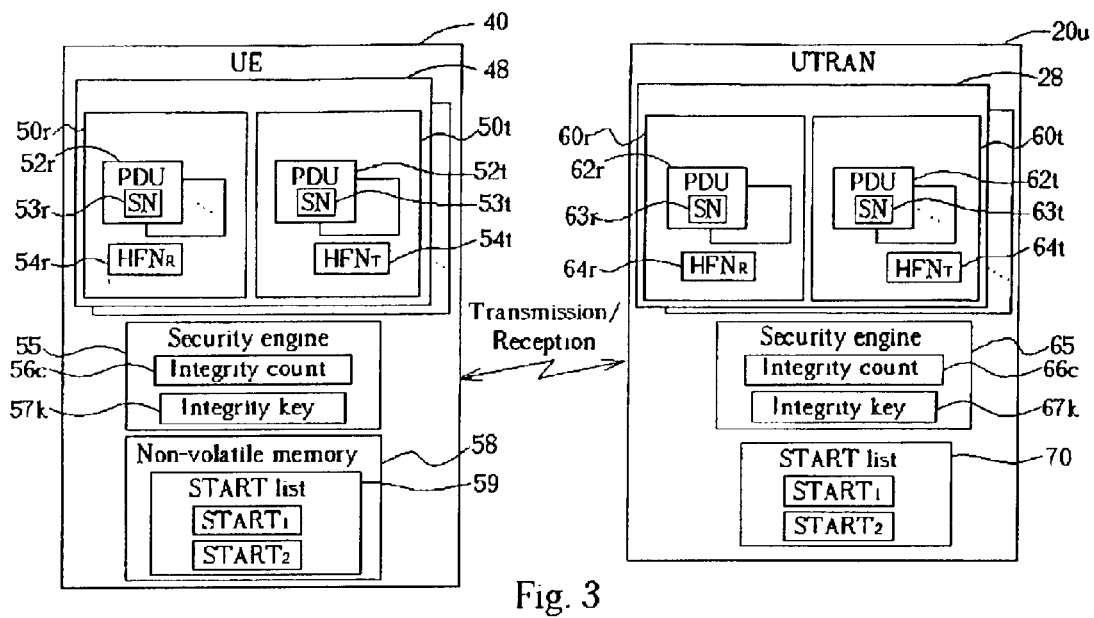
FIG. 3 is a simplified block diagram of the UTRAN and UE shown in FIG. 1.
Figure 4:
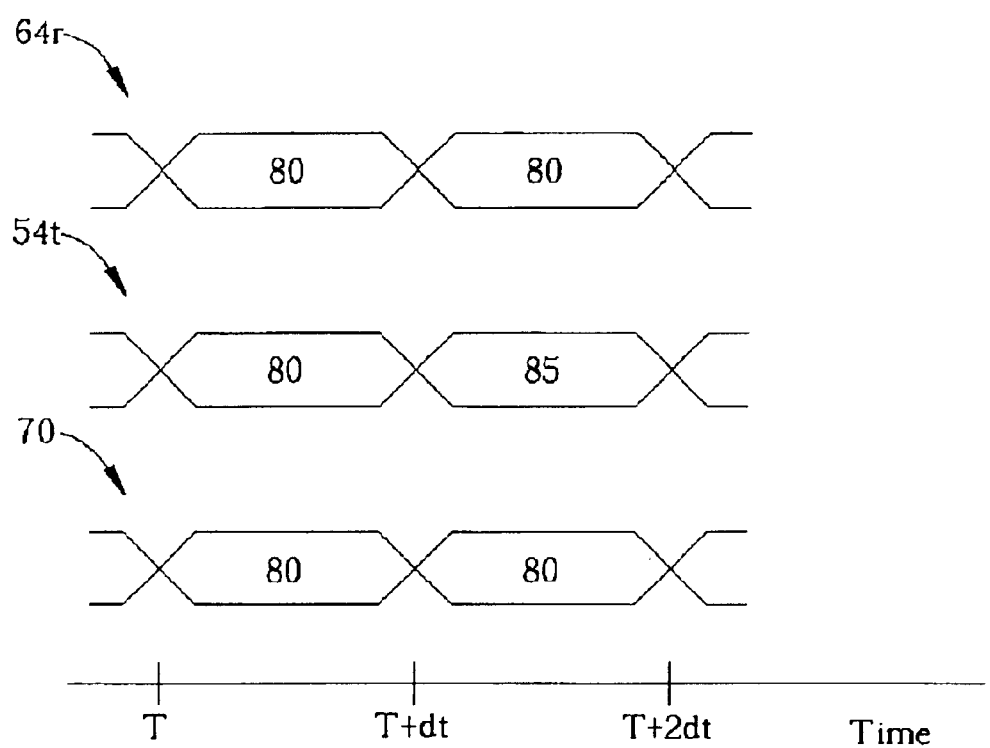
FIG. 4 is a timing diagram of operation related to the prior art integrity protection.
Figure 5:
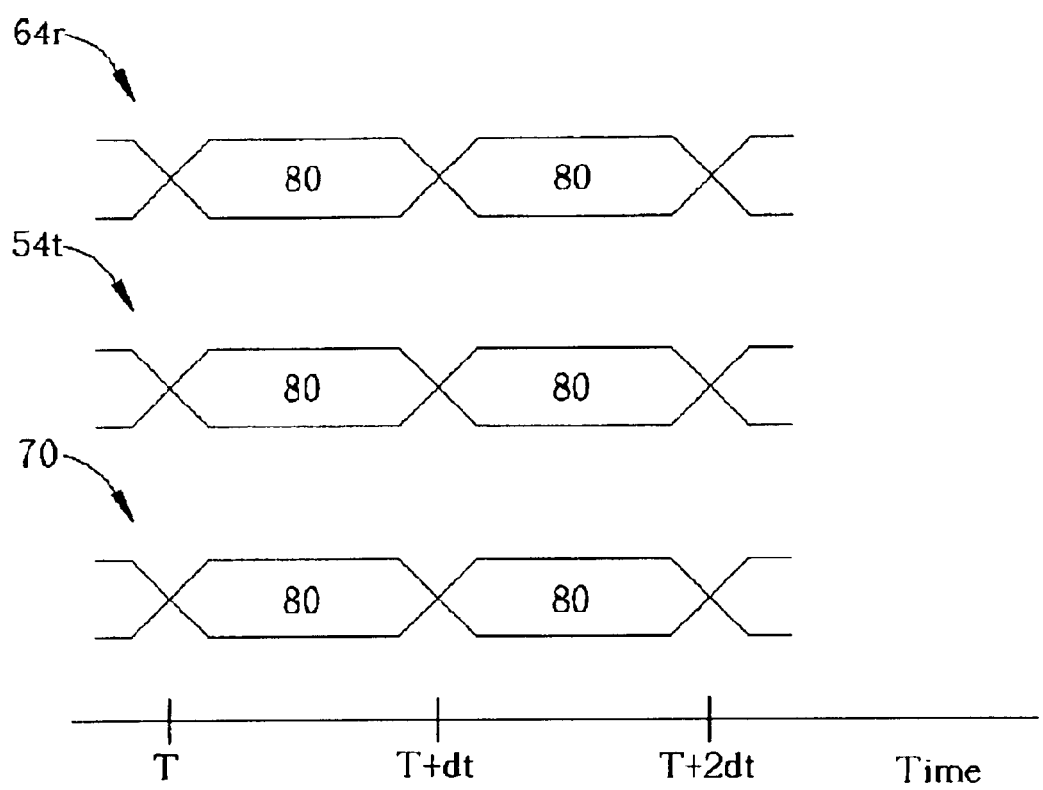
FIG. 5 is a timing diagram of operations related to the integrity protection according to the method of the present invention.

Please refer to FIG. 5, which is a timing diagram of operations related to the integrity protection according to the method of the present invention. The method according to the present invention is applied on the wireless communication system shown in FIG. 1 to FIG. 3. In the following description, a mobile unit (hereinafter termed a UE) may include a mobile telephone, a handheld transceiver, a base station, a personal data assistant (PDA), a computer, or any other device that requires a wireless exchange of data. In the preferred embodiment, please refer to FIG. 3 and FIG. 5 for the following disclosure related to the method of the present invention. Suppose the UE 40 is originally powered off, and the START list 59 has stored a value of 80 for one of the domains, say the CS domain 30c. In FIG. 5, the horizontal axis represents time. When the UE 40 is powered on at T, the UE 40 will first transmit the START list 59 to the UTRAN 20u. The UTRAN 20u thus has a corresponding START list 70 for keeping the START list 59 of the UE 40. It is noted that the START list 70 related to the UE 40 will hold the START value of 80 for the CS domain 30c. The START list 59 is used by the UE 40 to initialize the HFNs of the UE 40. The START list 70 is used by the UTRAN 20u to initialize the corresponding HFNs. Only the $HFN_T$ 54t and $HFN_R$ 64r are shown for simplicity. Consider a radio bearer 48 on the UE 40 that resides within the CS domain 30c. The HFNs 54r, 54t for this radio bearer 48 are initially set to 80 according to the START list 59. Because the UE 40 is powered on at T, there is no signaling radio bearer or radio bearer existed between the UTRAN 20u and the UE 40 initially. Therefore, there is no security count related to ciphering or integrity count 56c, 66c related to integrity protection. Generally speaking, the integrity protection normally is started before the ciphering operation. Therefore, when the UTRAN 20u sends a first "SECURITY MODE COMMAND" message at T+dt to start the integrity protection, the UTRAN 20u initializes the HFNs 64r, 64t of all radio bearers 28 according to the START list 70 that was last received from the UE 40. The HFNs 64r, 64t of the radio bearer 28 within the CS domain 30c thus become 80, as the START list 70 has not changed. A similar process occurs on the UE 40 side. Upon reception of the SECURITY MODE COMMAND, the UE 40 utilizes the START list 59 that was last transmitted to the UTRAN 20u to initialize the HFNs 54r, 54t of all radio bearers 48. Therefore, the example radio bearer 48 within the CS domain 30c will have the value of 80, which is the same value as that for the peer radio bearer 28 on the UTRAN 20u side. To sum up, the HFNs between the UE 40 and UTRAN 20u are synchronized for the integrity protection even though there is no applicable security count or integrity count in the beginning. Integrity protection parameters are thus synchronized by the SECURITY MODE COMMAND, and hence the integrity function is capable of performing successfully along the peer entity radio bearers 28, 48 for all domains 30p, 30c. Note that the operation related to the HFN initialization on the UE 40 side is the same for the circuit-switching core network 30c and packet-switching core network 30p.

In contrast to the prior art, the present invention causes initialization of the integrity counts to be modified according to the last transmitted and last received START lists, so that the integrity counts between UE and UTRAN are synchronized. This initialization is performed by both the UE and the UTRAN, and is performed in response to a SECURITY MODE procedure.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for setting an initial integrity count value for a radio bearer in a wireless communication system, the wireless communication system comprising:

an integrity key;

at least a mobile unit comprising a first integrity count value, the first integrity count value consisting of a predetermined bit length;

at least a universal terrestrial radio access network (UTRAN) comprising a second integrity count value, the second integrity count value consisting of the predetermined bit length, the UTRAN coupled to the mobile unit for transmitting a control command to the mobile unit, the control command used for starting an integrity protection process for the radio bearer, the integrity protection process using the integrity key and the first and second integrity count values for verifying a transmission integrity between the mobile unit and the UTRAN;

the method comprising:

transmitting a START value from the mobile unit to the UTRAN;

the UTRAN sending the control command to the mobile unit, and setting the x most significant bits of the second integrity count value equal to the START value; and setting the x most significant bits of the first integrity count value of the mobile unit equal to the START value last transmitted to the UTRAN in response to receiving the control command.

2. The method of claim 1 wherein the control command is further used for starting a ciphering process for the radio bearer so that ciphered data is transmitted by the radio bearer between the mobile unit and the UTRAN.

3. The method of claim 1 wherein a bit length of the START value is less than the predetermined bit length of the first integrity count value and the predetermined bit length of the second integrity count value.

4. The method of claim 1 wherein the START value is retrieved from a non-volatile memory positioned on the mobile unit.

5. The method of claim 4 wherein the non-volatile memory is a SIM card.

* * * * *